(12) United States Patent
Hamano et al.

(10) Patent No.: US 6,537,705 B1
(45) Date of Patent: *Mar. 25, 2003

(54) LITHIUM ION SECONDARY BATTERY AND ITS MANUFACTURE

(75) Inventors: Kouji Hamano, Tokyo (JP); Hisashi Shiota, Tokyo (JP); Yasuhiro Yoshida, Tokyo (JP); Michio Murai, Tokyo (JP); Takayuki Inuzuka, Tokyo (JP); Shigeru Aihara, Tokyo (JP); Sho Shiraga, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/355,981

(22) PCT Filed: Dec. 22, 1997

(86) PCT No.: PCT/JP97/04751

§ 371 (c)(1),
(2), (4) Date: Aug. 23, 1999

(87) PCT Pub. No.: WO99/33136

PCT Pub. Date: Jul. 1, 1999

(51) Int. Cl.$^7$ .............................. H01M 6/14; H01M 6/18
(52) U.S. Cl. ...................... 429/303; 429/306; 429/309; 429/316; 29/623.4
(58) Field of Search ................. 429/303, 127, 429/162, 247, 253, 231.95, 306, 309, 316; 29/623.4

(56) References Cited

U.S. PATENT DOCUMENTS

| | | | | |
|---|---|---|---|---|
| 5,437,692 A | * | 8/1995 | Dasgupta et al. | 29/623.1 |
| 5,453,333 A | * | 9/1995 | Takauchi et al. | 429/62 |
| 5,658,685 A | * | 8/1997 | Oliver | |
| 5,665,265 A | * | 9/1997 | Gies et al. | 252/62.2 |
| 5,741,609 A | * | 4/1998 | Chen et al. | |
| 5,849,433 A | * | 12/1998 | Venugopal et al. | 429/190 |
| 5,888,666 A | * | 3/1999 | Kawakami | 429/62 |
| 6,051,342 A | * | 4/2000 | Hamano et al. | 429/303 |
| 6,124,061 A | * | 9/2000 | Hamano et al. | 429/316 |

* cited by examiner

*Primary Examiner*—Carol Chaney
*Assistant Examiner*—Tracy Dove
(74) *Attorney, Agent, or Firm*—Oblon, Spivak, McClelland, Maier & Neustadt, P.C.

(57) ABSTRACT

A secondary lithium ion battery, comprising a plurality of laminates (12) each having a separator (7) holding an electrolytic solution to which a positive electrode (1) and a negative electrode (4) are joined with an adhesive resin layer (8) having a mixed phase composed of an electrolytic solution phase (9), a polymer gel phase (10) containing an electrolytic solution, and a polymer solid phase (11).

13 Claims, 5 Drawing Sheets

LITHIUM ION SECONDARY BATTERY AND ITS MANUFACTURE

TECHNICAL FIELD

This invention relates to a lithium ion secondary battery comprising a positive electrode and a negative electrode facing each other via a separator supporting an electrolyte. More particularly, it relates to a thin type lithium ion secondary battery having excellent charge and discharge characteristics.

BACKGROUND OF THE INVENTION

There has been an eager demand for reduction in size and weight of portable electronic equipment. To meet the demand, it is required not only to improve battery performance, such as high voltage, high energy density, and resistance to high load, but to widen the freedom of shape design and to secure safety. Development and improvement of a variety of batteries have been proceeding along these lines. Of currently available batteries, lithium ion batteries are the most promising secondary batteries for realizing a high voltage, a high energy density, and resistance to high load and the most expected to fulfill the above-described requirements.

A lithium ion secondary battery mainly comprises a positive electrode, a negative electrode, and an ion conducting layer interposed between the electrodes. The lithium ion secondary batteries that have been put to practical use employ a positive plate prepared by mixing a powdered active material, such as a lithium-cobalt complex oxide, and a powdered electron conductor with a binder resin and applying the mixture to an aluminum current collector; a negative plate prepared by mixing a powdered carbonaceous active material with a binder resin and applying the mixture to a copper current collector; and an ion conducting layer made of a porous film of polyethylene, polypropylene, etc. filled with a nonaqueous solvent containing lithium ions.

In the lithium ion secondary batteries that have been put to practical use, electrical connections among the positive electrode, the ion conducting layer, and the negative electrode are maintained by pressure application by using a firm battery case made of stainless steel, etc. However, such a case increases the weight of a lithium ion secondary battery to make it difficult to realize size and weight reduction. Moreover, the rigidness of the case narrows the freedom of shape design.

In order to achieve size and weight reduction and freedom of shape design of a lithium ion secondary battery, it is necessary to bond an ion conducting layer to a positive electrode and to a negative electrode and to maintain the joined state without applying pressure from the outside.

In this connection, U.S. Pat. No. 5,437,692 discloses a structure in which a lithium ion-conducting polymer is used as an ion conducting layer, and a positive electrode and a negative electrode are joined to the ion-conducting layer with an adhesive layer containing a lithium compound. WO95/15589 discloses a structure having a plastic ion-conducting layer to which a positive and a negative electrode are joined.

According to the method taught in U.S. Pat. No. 5,437,692 supra, however, the joint strength attained is not enough, the battery cannot be made sufficiently thin, and the ion conduction resistance between the positive and the negative electrodes through the ion-conducting layer is high so that the battery characteristics such as charge and discharge characteristics are insufficient for practical use. According to WO95/15589 supra, the ion-conducting layer, being plastic, cannot secure sufficient joint strength, and the thickness of the battery cannot be reduced sufficiently.

The present invention has been made in order to solve these problems. It provides a battery structure in which a positive and a negative electrode are brought into intimate contact with an ion-conducting layer (hereinafter referred to as a separator) with an adhesive resin to secure sufficient joint strength among the electrodes and the separator while suppressing ion conduction resistance among them on the same level as in a conventional battery put in a case.

DISCLOSURE OF THE INVENTION

A first lithium ion secondary battery according to the present invention comprises a plurality of laminates each having a separator holding an electrolytic solution to which a positive electrode and a negative electrode are joined with an adhesive resin layer having a mixed phase composed of an electrolytic solution phase, a polymer gel phase containing an electrolytic solution, and a polymer solid phase.

A second lithium ion secondary battery of the invention is the above-described 1st battery, wherein the plurality of laminates are formed by interposing the positive electrode and the negative electrode alternately among a plurality of cut sheets of the separator.

A third lithium ion secondary battery of the invention is the above-described 1st battery, wherein the plurality of laminates are formed by interposing the positive electrode and the negative electrode alternately between rolled separators.

A fourth lithium ion secondary battery of the invention is the above-described 1st battery, wherein the plurality of laminates are formed by interposing the positive electrode and the negative electrode alternately between folded separators.

A fifth lithium ion secondary battery of the invention is the above-described first battery, wherein the polymer gel phase and the polymer solid phase contain the same kind or different kinds of polymeric materials, and the polymeric material contained in the polymer gel phase and that contained in the polymer solid phase have different average molecular weights.

A sixth lithium ion secondary battery of the invention is the above-described first battery, wherein the polymer gel phase and the polymer solid phase contain polyvinylidene fluoride, and the polyvinylidene fluoride contained in the polymer gel phase and that contained in the polymer solid phase are different in average molecular weight.

A seventh lithium ion secondary battery of the invention is the above-described first battery, wherein the polymer gel phase and the polymer solid phase contain polyvinyl alcohol, and the polyvinyl alcohol contained in the polymer gel phase and that contained in the polymer solid phase are different in average molecular weight.

In the first to seventh lithium ion secondary batteries, both joint strength and ion conductivity among the positive electrode, the negative electrode, and the separator can be obtained by adhesion with the above-mentioned adhesive resin layer which has a mixed phase made up of an electrolytic solution phase, a polymer gel phase containing an electrolytic solution, and a polymer solid phase. Owing to the adhesive strength and high ion conductivity thus secured, there is provided a practical compact lithium ion secondary battery of laminated electrode type which has a plurality of electrode laminates and yet requires no firm battery case and has high performance and a large capacity.

A process for producing the first lithium ion secondary battery according to the present invention is a process for producing a lithium ion secondary battery comprising a plurality of laminates each having a separator holding an electrolytic solution to which a positive electrode and a negative electrode are joined, which comprises coating the facing sides of a plurality of separators with an adhesive comprising two or more polymeric materials different in average molecular weight dissolved in a solvent, joining a positive electrode and a negative electrode alternately among the plurality of the separators via an adhesive resin layer to form a battery body, and impregnating the battery body with an electrolytic solution to make the adhesive resin layer a mixed phase composed of a polymer gel phase containing the electrolytic solution, a polymer solid phase, and an electrolytic solution phase. On being impregnated with an electrolytic solution, the adhesive resin layer becomes a mixed phase composed of a polymer gel phase containing the electrolytic solution, a polymer solid phase, and a layer of the electrolytic solution. Both the joint strength and ion conductivity between each of the positive and negative electrodes and the separator can be secured thereby. The thus laminated units can be piled to provide a practical and stable lithium ion secondary battery which can take a compact, thin, and arbitrary shape, having no firm battery case, and also exhibits high charge and discharge efficiency.

BRIEF DESCRIPTION OF THE DRAWINGS

In FIGS. 5 and 6, curves (A) and (B) indicate charge characteristics and discharge characteristics, respectively.

BEST MODE FOR CARRYING OUT THE INVENTION

The practice in carrying out the present invention will be described by referring to the accompanying drawings.

Figure 1:
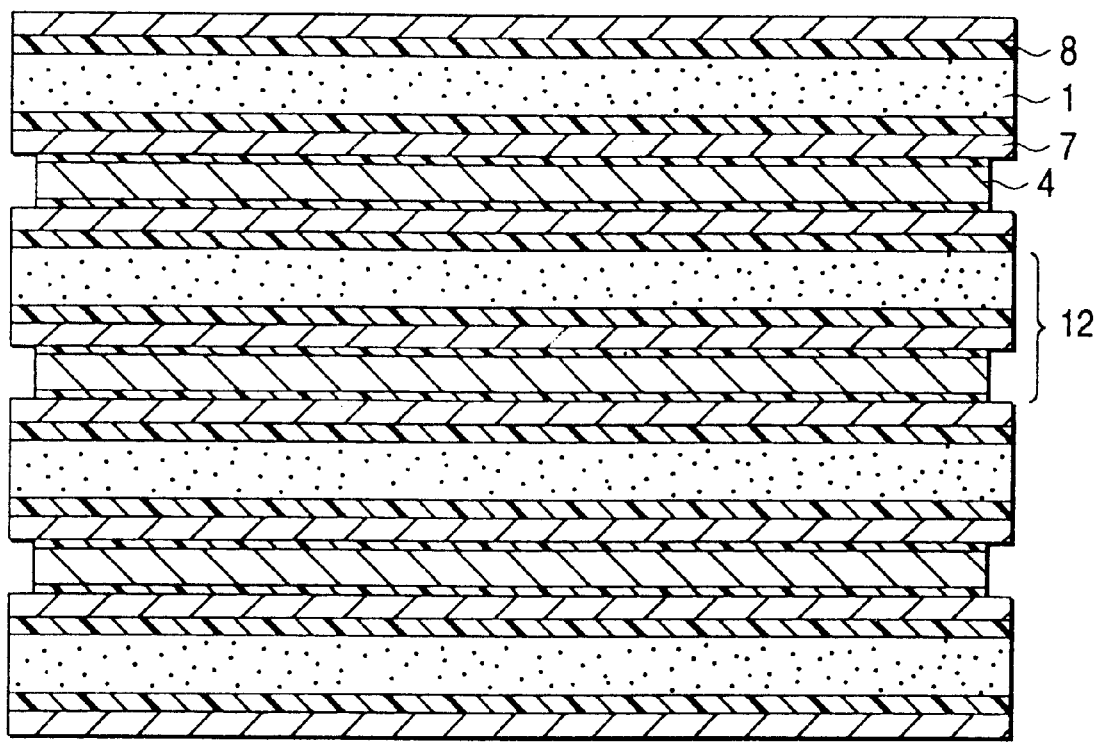
FIGS. 1, 2, and 3 are each a schematic cross section showing the main part of the lithium ion secondary battery according to an embodiment of the present invention, which comprises a plurality of unit laminates.
Figure 2:
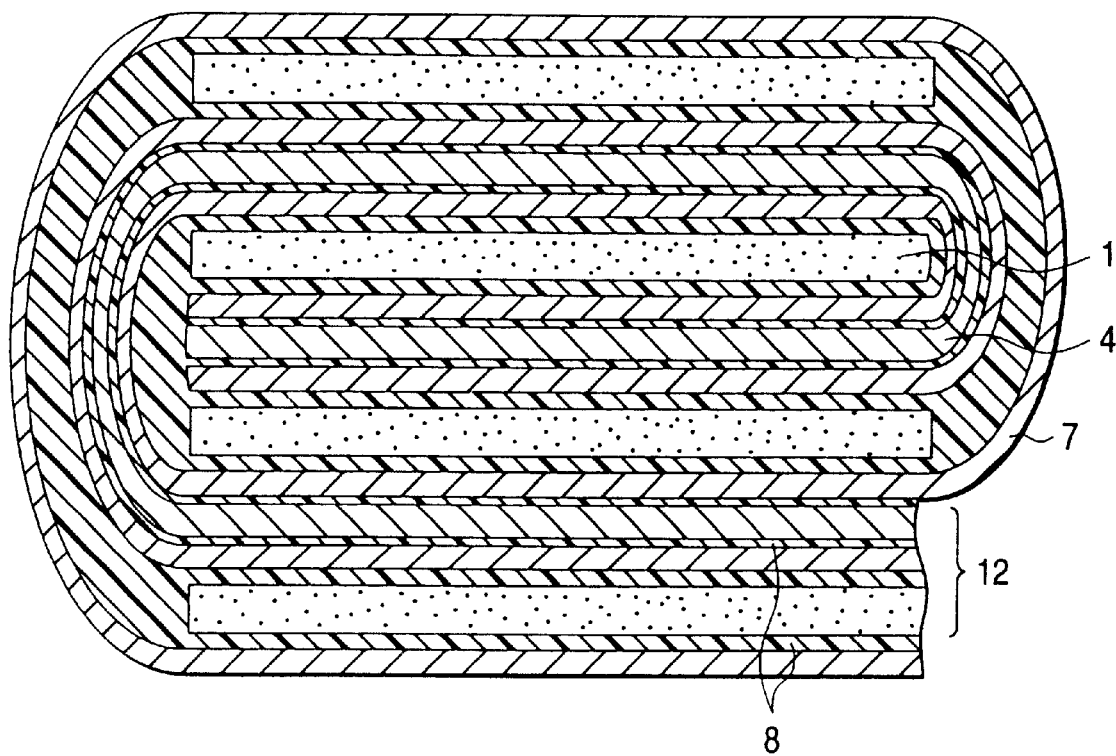
Figure 3:
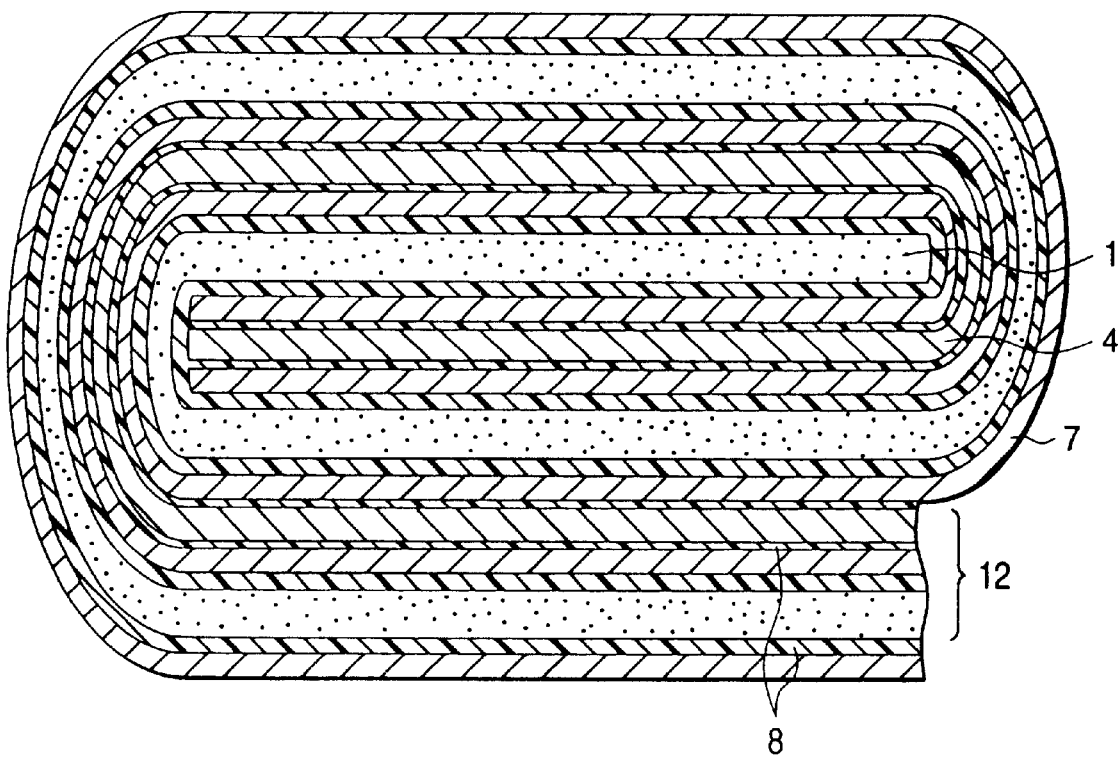
Figure 4:
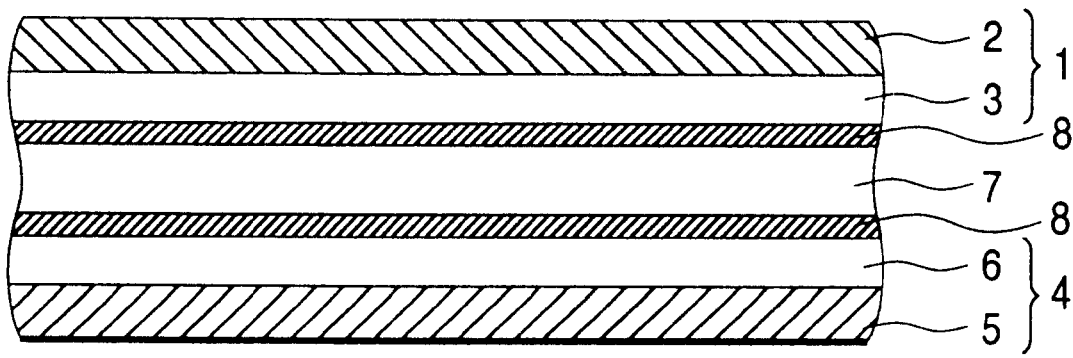
FIG. 4 is a schematic cross section illustrating the structure of the unit laminate shown in FIGS. 1, 2 and 3.
Figure 4:
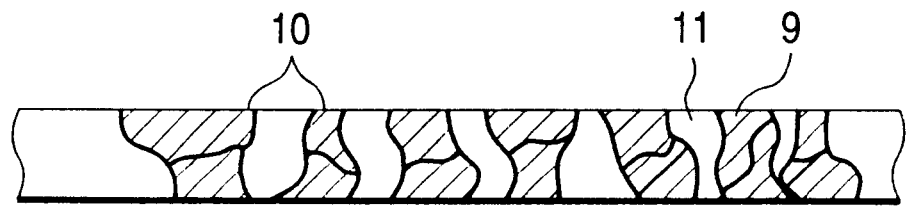

FIGS. 1 through 3 each show a schematic cross section of the main part of the lithium ion secondary battery according to an embodiment of the invention. FIGS. 4(*a*) and 4(*b*) are each a schematic cross section illustrating the structure of the laminate shown in FIGS. 1 through 3. FIG. 4(*b*) is an enlarged partial view of the adhesive resin layer of FIG. 4(*a*).

In FIGS. 1 through 4, numeral 12 indicates a laminate. The laminate 12 is made up of a positive electrode 1 comprising a positive electrode current collector 2 made of metal, e.g., aluminum foil, having formed thereon a positive electrode active material layer 3; a negative electrode 4 comprising a negative electrode current collector 5 made of metal, e.g., copper, having formed thereon a negative electrode active material layer 6; a separator 7 holding an electrolytic solution containing lithium ions; and adhesive resin layers 8 which join the positive electrode 1 and the negative electrode to the separator 7.

FIG. 1 shows a structure in which positive electrodes 1 and negative electrodes 4 are alternately arranged among a plurality of cut sheets of separators 7. FIGS. 2 and 3 show a structure in which positive electrodes 1 and negative electrodes 4 are alternately arranged between a rolled pair of separators 7. While not shown, the positive electrodes 1 and the negative electrodes 4 can alternate between a folded pair of separators.

As shown in FIG. 4(*b*), the adhesive resin layer 8 has a mixed phase made up of a polymer solid phase 11, a polymer gel phase 10 containing an electrolytic solution, and an electrolytic solution phase 9 which is held in fine pores formed in the polymer solid phase 11 or the polymer gel phase 10.

The polymer solid phase 11 of the adhesive resin layer 8 functions to firmly join (adhere) the positive electrode 1 to one side of the separator 7, and the negative electrode 4 to the other side of the separator 7. The electrolytic solution phase 9 affords high ion conductivity. The polymer gel phase 10 serves not only to prevent reduction in joint (adhesive) strength between the polymer solid phase 11 and the electrolytic solution phase 9 due to mutual dissolution but to retain the high ion conductivity, thereby securing extremely high ion conductivity among the separator 7, the positive electrode 1, and the negative electrode 4.

An adhesive prepared by dissolving polymeric materials having different average molecular weights in a solvent is used so that the adhesive resin layer 8 may form the polymer solid phase 11 and the polymer gel phase 10.

That is, the adhesive to be used is a uniform solution of a polymeric material that swells in an electrolytic solution (polymer of lower molecular weight) and a polymeric material that does not swell in an electrolytic solution (polymer of higher molecular weight) in an appropriate solvent. The positive electrode 1 and the negative electrode 4 are joined to the separator 7 with the adhesive. After the adhesive is thoroughly dried, it is impregnated with an electrolytic solution at a prescribed temperature thereby to form the adhesive resin layer 8 having a mixed phase composed of the polymer solid phase 11 comprising the higher molecular polymer, the gel phase 11 comprising the lower molecular polymer, and the electrolytic solution phase 9.

The polymeric materials having different average molecular weights may be of a kind or different kinds. A combination of polymeric materials different in kind but equal in average molecular weight can form a gel phase and a solid phase. In such a case, too, it is preferred that the polymeric materials be different in average molecular weight for the following reason. Where polymeric materials different in kind but close in molecular weight are used, it is likely that the gel state changes with time due to development of so-called topological entanglement in a solution system, which can result in change of battery characteristics.

The polymeric materials which can be used to form the adhesive resin layer 8 must neither dissolve in an electrolytic solution nor react in a lithium ion secondary battery. They are also required to provide a gel phase and a solid phase in the presence of an electrolytic solution. Any polymeric materials that satisfy these conditions are employable. A polymeric material can take a gel state or a solid state depending on the kind of the solvent of an electrolytic solution or the thermal history in the preparation of a lithium ion secondary battery. Examples of polymeric materials which can be a gel phase include acrylic ester polymers, such as polymethyl methacrylate, polyacrylonitrile, low-molecular weight polyvinylidene fluoride, and copolymers comprising these polymers and other polymers; low-molecular weight polyvinyl alcohol and copolymers comprising the low-molecular weight polyvinyl alcohol and other polymers; and mixtures mainly comprising low-molecular weight polyvinyl alcohol. Examples of polymeric materials which can be a solid phase include high-molecular weight polyvinylidene fluoride, polytetrafluoroethylene, and copolymers of these polymers and other polymers; high-molecular weight polyvinyl alcohol and copolymers of the high-molecular weight polyvinyl alcohol and other polymers; and mixtures mainly comprising high-molecular weight polyvinyl alcohol.

Positive electrode active materials which can be used in the positive electrode active material layer 3 include complex oxides of lithium and a transition metal, such as cobalt, manganese or nickel; chalcogen compounds containing lithium; or complex compounds thereof; and these complex oxides, chalcogen compounds or complex oxides to which various dopant elements have been added. Negative electrode active materials that can be used in the negative electrode active material layer 6 include any materials capable of intercalating and disintercalating lithium ions, such as carbonaceous materials.

Any metal stable within a battery can be used as a positive electrode current collector 2 and a negative electrode current collector 5. Aluminum is preferred as a positive electrode current collector 2, and copper is preferred as a negative electrode current collector 5. The current collectors 2 and 5 may have any form, -such as foil, net or expanded metal. Those presenting a large void area, such as net and expanded metal, are preferred for obtaining-joint strength to the active material layers 3 and 6 and for facilitating impregnation with an electrolytic solution after joining.

Any insulating material that can be impregnated with an electrolytic solution and has sufficient strength, such as porous film, net, and nonwoven fabric, can be used as a separator 7. A porous film of polyethylene, polypropylene, etc. is preferably used for adhesiveness and safety. Separators made of some of fluorocarbon resins need plasma surface treatment to improve adhesion.

The electrolytic solution which can be used includes a solution of an electrolyte, such as $LiPF_6$, $LiClO_4$, $LiBF_4$, $LiCF_3SO_3$, $LiN(CF_3SO_2)_2$, $LiC(CF_3SO_2)_3$ or $LiN(C_2F_5SO_2)_2$, in an ether solvent, such as dimethoxyethane, diethoxyethane, dimethyl ether, and diethyl ether, an ester solvent, such as ethylene carbonate, propylene carbonate, dimethyl carbonate, and diethyl carbonate, or a mixture thereof.

The lithium ion secondary battery of the invention will now be illustrated in greater detail with reference to Examples, but the present invention is by no means limited thereto.

EXAMPLE 1

Preparation of Positive Electrode

Eighty-seven parts by weight of $LiCoO_2$, 8 parts by weight of graphite powder, and 5 parts of polyvinylidene fluoride were dispersed in N-methylpyrrolidone (hereinafter abbreviated as NMP) to prepare positive electrode active material paste. The paste was applied with a doctor blade to a coating thickness of 300 μm to form a positive electrode active material film. A 30 μm thick aluminum net as a positive electrode current collector 2 was placed thereon, and the positive electrode active material paste was again spread on the net with a doctor blade to a thickness of 300 μm. The double-coated aluminum net was allowed to stand in a drier kept at 60° C. for 60 minutes to make the paste layers half-dried. The resulting laminate composed of the positive electrode current collector 2 and the positive electrode active material was rolled to a thickness of 400 μm to prepare a positive electrode 1 having positive electrode active material layers 3. The positive electrode 1 was immersed in an electrolytic solution. The peel strength between the positive electrode active material layer and the positive electrode current collector measured after the immersion was found to be 20 to 25 gf/cm.

Preparation of Negative Electrode

Ninety-five parts by weight of Mesophase Microbead Carbon (a trade name, produced by Osaka Gas Co., Ltd.) and 5 parts by weight of polyvinylidene fluoride were dispersed in NMP to prepare negative electrode active material paste. The paste was applied with a doctor blade to a thickness of 300 μm to make a negative electrode active material film. A 20 μm thick copper net as a negative electrode current collector was placed thereon, and the negative electrode active material paste was again spread thereon with a doctor blade to a thickness of 300μm. The laminate was allowed to stand in a drier at 60 ° C. for 60 minutes to make the paste half-dried.

The resulting laminate composed of the negative electrode current collector 5 and the negative electrode active material was rolled to a thickness of 400 μm to prepare a negative electrode 4 having negative electrode active material layers 6.

The negative electrode 4 was immersed in an electrolytic solution. The peel strength between the negative electrode active material layer 6 and the negative electrode current collector 5 measured after the immersion was found to be 5 to 10 gf/cm.

Preparation of Adhesive

A mixture of 3.0 parts by weight of polymethyl methacrylate having an average molecular weight (Mw) of 350,000 (produced by Aldrich), 2.0 parts by weight of polyvinylidene fluoride having an average molecular weight (Mw) of 534,000 (produced by Aldrich), and 95 parts by weight of NMP was thoroughly stirred to prepare a uniform and viscous adhesive.

Preparation of Battery

The adhesive thus prepared was applied to a side each of two porous polypropylene sheets (Cellguard #2400, produced by Hoechest) used as a pair of separators 7. Before the adhesive dried, the above-prepared positive electrode 1 (or negative electrode) was sandwiched and joined in between the separators 7, and the laminate was dried at 60° C. for 2 hours. NMP evaporated from the adhesive to give a porous film having open cells.

The pair of the separators 7 having the positive electrode 1 (or negative electrode) bonded therebetween was punched to obtain a cut piece of prescribed size. The adhesive was applied to one side of the cut piece, and a cut piece of the negative electrode 4 (or positive electrode) having a prescribed size was stuck thereto. The adhesive was then applied to a side of another cut piece of the separator 7 having a prescribed size, and the coated side was stuck to the negative electrode 4 (or positive electrode) which had been stuck to the laminate. The above-described steps were repeated to build up a battery body having a plurality of electrode laminates. The battery body was dried while applying pressure to prepare a tabular laminated battery body as shown in FIG. 1.

Current collecting tabs each connected to the end of every positive current collectors and every negative current collectors of the tabular laminated battery body were spot-welded among the positive electrodes and among the negative electrodes, respectively, to complete parallel electrical connections in the tabular laminated battery body.

The tabular laminated battery body was immersed in an electrolytic prepared by dissolving $LiPF_6$ in a 1:1 (by mole) mixed solvent of ethylene carbonate and dimethyl carbonate in a concentration of 1.0 mol/dm$^3$ at room temperature to infiltrate the electrolytic solution into the battery body.

The peel strength between the positive electrode active material layer 3 and the separator 7 and between the negative electrode active material layer 6 and the separator 7 was 25 to 30 gf/cm and 15 to 20 gf/cm, respectively, as measured in accordance with JIS K6854.

The impregnated tabular laminated battery body was put in an aluminum laminated film pack, and the opening of the pack was heat-sealed to complete a lithium ion secondary battery.

EXAMPLE 2

A battery having the tabular laminated battery body shown in FIG. 1 was prepared in the same manner as in Example 1, except for changing the adhesive preparation as described below.

Preparation of Adhesive

A mixture of 3.0 parts by weight of polyacrylonitrile having an average molecular weight (Mw) of 86,200 (produced by Aldrich), 2.0 parts by weight of polyvinylidene fluoride having an average molecular weight (Mw) of 534,000 (produced by Aldrich), and 95 parts by weight of NMP was thoroughly stirred to prepare a uniform and viscous adhesive.

EXAMPLE 3

A battery having the tabular laminated battery body shown in FIG. 1 was prepared in the same manner as in Example 1, except for changing the adhesive preparation as described below.

Preparation of Adhesive

A mixture of 2.5 parts by weight of polyvinylidene fluoride having an average molecular weight (MW) of 180,000 (produced by Aldrich), 2.5 parts by weight of polyvinylidene fluoride having an average molecular weight (Mw) of 534,000 (produced by Aldrich) and 95 parts by weight of NMP was thoroughly stirred to prepare a uniform and viscous adhesive.

EXAMPLE 4

A battery having the tabular laminated battery body shown in FIG. 1 was prepared in the same manner as in Example 1, except for changing the adhesive preparation as described below.

Preparation of Adhesive

A mixture of 3.5 parts by weight of polyvinylidene fluoride having an average molecular weight (Mw) of 180,000 (produced by Aldrich), 3.5 parts by weight of polyvinylidene fluoride having an average molecular weight (Mw) of 534,000 (produced by Aldrich), and 93 parts by weight of NMP was thoroughly stirred to prepare a uniform and viscous adhesive.

EXAMPLE 5

A battery having the tabular laminated battery body shown in FIG. 1 was prepared in the same manner as in Example 1, except for changing the adhesive preparation as described below.

Preparation of Adhesive

A mixture of 5.0 parts by weight of polyvinylidene fluoride having an average molecular weight (Mw) of 180,000 (produced by Aldrich), 5.0 parts by weight of polyvinylidene fluoride having an average molecular weight (Mw) of 534,000 (produced by Aldrich), and 90 parts by weight of NMP was thoroughly stirred to prepare a uniform and viscous adhesive.

EXAMPLE 6

A battery having the tabular laminated battery body shown in FIG. 1 was prepared in the same manner as in Example 1, except for altering the adhesive preparation and the electrolytic solution used in the preparation of the battery as described below.

Preparation of Adhesive

A mixture of 2.5 parts by weight of polyvinylidene fluoride having an average molecular weight (Mw) of 180,000 (produced by Aldrich), 2.5 parts by weight of polyvinylidene fluoride having an average molecular weight (Mw) of 534,000 (produced by Aldrich), and 90 parts by weight of NMP was thoroughly stirred to prepare a uniform and viscous adhesive.

Electrolytic Solution $LiPF_6$ (produced by Tokyo Kasei) was dissolved in a 1:1 (by mole) mixed solvent of ethylene carbonate (produced by Kanto Chemical) and diethyl carbonate (produced by Wako Pure Chemical) in a concentration of 1.0 mol/dm$^3$.

EXAMPLE 7

A battery having the tabular laminated battery body shown in FIG. 1 was prepared in the same manner as in Example 6, except for altering the adhesive preparation as described below. Preparation of Adhesive:

A mixture of 3.5 parts by weight of polyvinylidene fluoride having an average molecular weight (Mw) of. 180,000 (produced by Aldrich), 3.5 parts by weight of polyvinylidene fluoride having an average molecular weight (Mw) of 534,000 (produced by Aldrich) and 93 parts by weight of NMP was thoroughly stirred to prepare a uniform and viscous adhesive.

EXAMPLE 8

A battery having the tabular laminated battery body shown in FIG. 1 was prepared in the same manner as in Example 6, except for changing the adhesive preparation as described below.

Preparation of Adhesive

A mixture of 5.0 parts by weight of polyvinylidene fluoride having an average molecular weight (Mw) of 180, 000 (produced by Aldrich), 5.0 parts by weight of polyvinylidene fluoride having an average molecular weight (Mw) of 534,000 (produced by Aldrich), and 93 parts by weight of NMP was thoroughly stirred to prepare a uniform and viscous adhesive.

EXAMPLE 9

A battery having the tabular laminated battery body shown in FIG. 1 was prepared in the same manner as in Example 1, except for altering the adhesive preparation as described below and changing the temperature for infiltrating the electrolytic solution in the preparation of the battery body to 70° C.

Preparation of Adhesive

A mixture of 2.5 parts by weight of polyvinylidene fluoride having an average molecular weight (Mw) of 180,000 (produced by Aldrich), 2.5 parts by weight of polyvinylidene fluoride having an average molecular weight (Mw) of 534,000, (produced by Aldrich), and 95 parts by weight of NMP was thoroughly stirrd to prepare a uiform and viscous adhesive.

EXAMPLE 10

A battery having the tabular laminated battery body shown in FIG. 1 was prepared in the same manner as in Example 1, except for changing the adhesive preparation as described below.

Preparation of Adhesive

A mixture of 2.5 parts by weight of polyvinyl alcohol having an average molecular weight (Mw) of 22,000 (produced by Nakarai Kagaku), 2.5 parts by weight of polyvinyl alcohol having an average molecular weight (Mw) of 186,000 (produced by Aldrich), and 95 parts by weight of NMP was thoroughly stirred to prepare a uniform and viscous adhesive.

EXAMPLE 11

A battery having the tabular laminated battery body shown in FIG. 1 was prepared in the same manner as in Example 1, except for changing the adhesive preparation as described below.

Preparation of Adhesive

A mixture of 1.5 parts by weight of polyvinylidene fluoride having an average molecular weight (Mw) of 180,000, 1.5 parts by weight of polyvinyl alcohol having an average molecular weight (Mw) of 22,000, 2.5 parts by weight of polyvinylidene fluoride having an average molecular weight (Mw) of 534,000, and 95 parts by weight of NMP was thoroughly stirred to prepare a uniform and viscous adhesive.

EXAMPLE 12

Lithium ion secondary batteries having the tabular laminated battery body shown in FIG. 2 were prepared by using the positive and the negative electrodes described in Example 1 and the adhesives described in Examples 1 to 11.

Preparation of Battery

The adhesive was applied to a side of two porous polypropylene sheets (Cellguard #2400, produced by Hoechest) as two separators 7 of band form. The negative electrode 4 (or positive electrode) of band form was sandwiched and stuck between the two separators with their coated side inward, and the laminate was put in a warm air drier at 60° C. for 2 hours to evaporate NMP.

The adhesive was then applied to one of the paired separators 7 of band form having the negative electrode 4 (or positive electrode) therebetween. One end of the adhesive-coated separator 7 was folded back at a prescribed length while inserting the positive electrode 1 (or negative electrode) into the fold, and the laminate was passed through a laminator. Subsequently, the adhesive was applied to the other separator 7 of band form, and another piece of the positive electrode 1 (or negative electrode) was stuck thereto at the position corresponding to the positive electrode 1 (or negative electrode) having been inserted into the fold. The paired separators were rolled up to make an oblong ellipsoid. The separators were again rolled up with a still another cut piece of the positive electrode (or negative electrode) inserted therein. These steps were repeated to form a battery body having a plurality of electrode laminates. The battery body was dried under pressure to obtain a tabular roll type laminated battery body as shown in FIG. 2.

Current collector tabs connected to the end of every positive electrode current collector and the negative electrode current collector of the resulting tabular laminated battery body were spot welded to establish parallel electrical connections.

The tabular laminated battery body was immersed in an electrolytic solution of 1.0 mol/dm$^3$ of lithium hexafluorophosphate in a mixed solvent (1:1 by mole) of ethylene carbonate and dimethyl carbonate and heat-sealed into an aluminum laminate film pack to make a battery.

While Example 12 has shown an example in which a pair of separators 7 is rolled up, the battery body may be such that is prepared by repeating a step of folding a pair of separator bands having a negative electrode 4 (or positive electrode) of band form joined therebetween while sticking a cut piece of a positive electrode 1 (or negative electrode) into each fold.

EXAMPLE 13

Lithium ion secondary batteries having the tabular laminated battery body shown in FIG. 3 were prepared by using the positive and the negative electrodes shown in Example 1 and the adhesives shown in Examples 1 to 11. The difference from Example 12 lies in that a laminate of a positive electrode, a negative electrode, and separators were rolled up-simultaneously.

Preparation of Battery

The negative electrode 4 (or positive electrode) of band form was set between a pair of porous polypropylene sheets (Cellguard #2400, produced by Hoechest) as separators 7, and the positive electrode 1 (or negative electrode) of band form was placed on the outer side of one of the separators 7 with a prescribed length of its starting end sticking out over the end of that separator 7. The adhesive was applied to the inner sides of the paired separators 7 and the outer side of the separator 7 on which the positive electrode 1 (or negative electrode) had been arranged. The positive electrode 1 (or negative electrode), the two separators 7, and the negative electrode 4 (or positive electrode) were stuck together and passed through a laminator. The adhesive was applied to the outer side of the other separator 7, and the sticking end of the positive electrode 1 (or negative electrode) was folded back and stuck to the coated side of the separator 7. The laminate was rolled up in such a manner that the folded positive electrode 1 (or negative electrode) might be wrapped in, making an oblong ellipsoid, to form a battery body comprising a plurality of electrode laminates. The battery body was dried under pressure to prepare a tabular roll type laminated battery body.

Current collector tabs connected to the end of the positive and the negative electrode collectors of the resulting tabular roll type laminated battery body were spot welded among the positive electrodes and among the negative electrodes to make parallel electrical connections.

The tabular laminated battery body was immersed in an electrolytic solution comprising an ethylene carbonate/dimethyl carbonate mixed solvent (1:1 by mole) having dissolved therein 1.0 mol/dm$^3$ of LiPF$_6$ and heat-sealed into an aluminum laminate film pack to complete a battery.

COMPARATIVE EXAMPLE 1

A lithium ion secondary battery was prepared in the same manner as in Example 1, except for changing the adhesive preparation as described below.

Preparation of Adhesive

A mixture of 5.0 parts by weight of polymethyl methacrylate having an average molecular weight (Mw) of 350,000 and 95 parts by weight of NMP was thoroughly stirred to prepare a uniform and viscous adhesive.

COMPARATIVE EXAMPLE 2

A lithium ion secondary battery having the tabular laminated battery body shown in FIG. 1 was prepared in the same manner as in Example 1, except for changing the adhesive preparation as described below.

Preparation of Adhesive

A mixture of 5.0 parts by weight of polyacrylonitrile having an average molecular weight (Mw) of 86,200 and 95 parts by weight of NMP was thoroughly stirred to prepare a uniform and viscous adhesive.

COMPARATIVE EXAMPLE 3

A lithium ion secondary battery was prepared in the same manner as in Example 1, except for changing the adhesive preparation as described below.

Preparation of Adhesive

A mixture of 5.0 parts by weight of polyvinylidene fluoride having an average molecular weight (Mw) of 180,000 (produced by Aldrich) and 95 parts by weight of NMP was thoroughly stirred to prepare a uniform and viscous adhesive.

COMPARATIVE EXAMPLE 4

A lithium ion secondary battery having the tabular laminated battery body shown in FIG. 1 was prepared in the same manner as in Example 1, except for changing the adhesive preparation as described below.

Preparation of Adhesive

A mixture of 7.0 parts by weight of polyvinylidene fluoride having an average molecular weight (Mw) of 534,000 (produced by Aldrich) and 95 parts by weight of NMP was thoroughly stirred to prepare a uniform and viscous adhesive.

COMPARATIVE EXAMPLE 5

A lithium ion secondary battery having the tabular laminated battery body shown in FIG. 1 was prepared in the same manner as in Example 1, except for using the same adhesive as used in Examples 6 and 9 and changing the temperature for infiltrating the electrolytic solution in the preparation of the battery body to 100° C.

Figure 5:
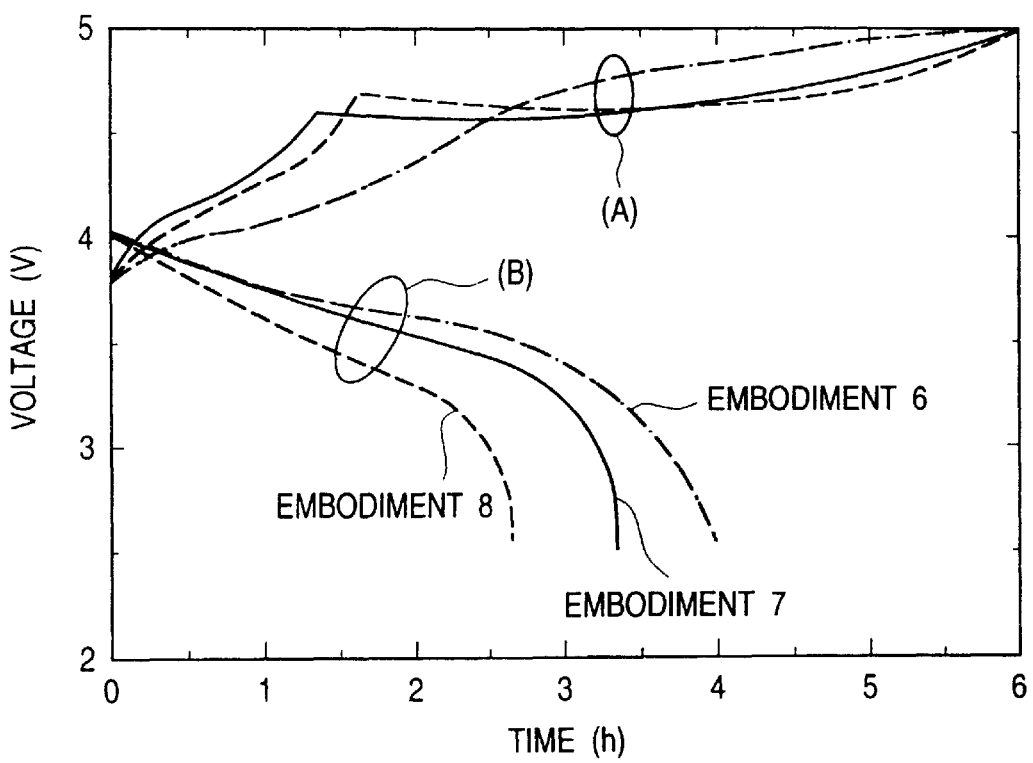
FIG. 5 is a graph showing the results of an over charge test (200% charge).
Figure 6:
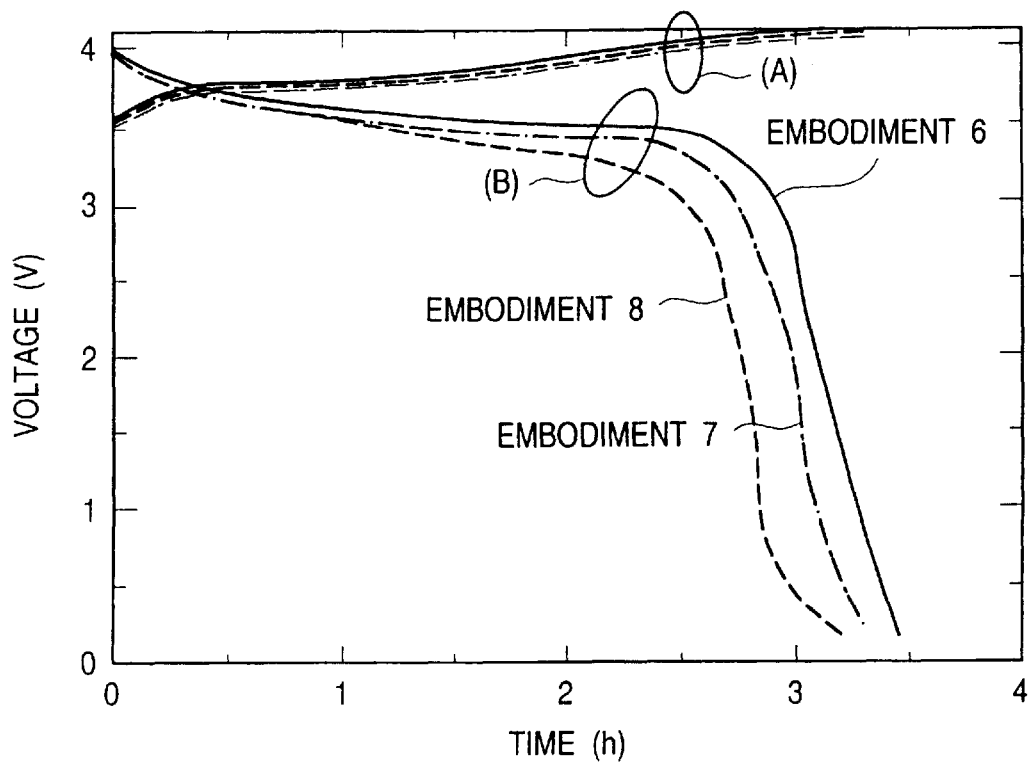
FIG. 6 is a graph showing the results of an over discharge test.

The characteristics of the lithium ion secondary batteries obtained in Examples 1 to 11 and Comparative Examples 1 to 5 were evaluated. Table 1 shows the results of measurements of cell resistivity and adhesive strength (peel strength) between the positive active material and the separator and between the negative active material and the separator in the batteries of Examples 1 to 11 and Comparative Examples 1 to 5. FIG. 5 shows the results of an over charge test (200% charge). FIG. 6 shows the results of an over discharge test. In these figures, (A) and (B) indicate charge characteristics and discharge characteristics, respectively. While FIGS. 5 and 6 show the results of the lithium ion secondary batteries of Examples 6 to 8, other Examples gave equal results.

TABLE 1

| | Peel Strength (gf/cm) | | |
|---|---|---|---|
| | Positive Electrode/ Separator | Negative Electrode/ Separator | Cell Resistivity (Ω) |
| Example 1 | 17 | 12 | 24 |
| Example 2 | 15 | 14 | 23 |
| Example 3 | 20 | 13 | 21 |
| Example 4 | 22 | 33 | 25 |
| Example 5 | 21 | 52 | 30 |
| Example 6 | 25 | 15 | 20 |
| Example 7 | 24 | 29 | 22 |
| Example 8 | 28 | 44 | 28 |
| Example 9 | 26 | 16 | 20 |
| Example 10 | 20 | 12 | 21 |
| Example 11 | 23 | 14 | 27 |
| Compara. Example 1 | 0 (unmeasurable) | 0 (unmeasurable) | unmeasurable |
| Compara. Example 2 | 0 (unmeasurable) | 0 (unmeasurable) | unmeasurable |
| Compara. Example 3 | 0 (unmeasurable) | 0 (unmeasurable) | unmeasurable |
| Compara. Example 4 | 52 | 61 | 150 |
| Compara. Example 5 | 0 (unmeasurable) | 0 (unmeasurable) | unmeasurable |

As is apparent from the results in Table 1, the peel strength of the lithium ion secondary batteries of Comparative Examples 1 to 3 was unmeasurable, being nearly zero. All the adhesives used in Comparative Examples 1 to 3 swelled in the electrolytic solution to become a layer comprising the electrolytic solution and a polymer gel phase containing the electrolytic solution. Therefore, the adhesive resin layer seemed to have an increased ion conductivity but failed to maintain the adhesive strength. The electrodes were separated as a result, and the electrical resistivity increased too much to measure.

The lithium ion secondary battery of Comparative Example 4, while showing a great peel strength, had a high resistivity due to low ion conductivity.

The lithium ion secondary battery of Comparative Example 5 had an unmeasurable peel strength close to zero and an unmeasurably high resistivity. Although the adhesive used in Comparative Example 5 had the same composition as in Examples 6 and 9, the impregnating electrolytic solution as high as 100° C. swelled the high polymer that does not swell in low temperatures. It followed that the adhesive failed to retain the adhesive strength similarly to Comparative Examples 1 to 3, while the ion conductivity appeared to increase.

On the other hand, the lithium ion secondary batteries of Examples 1 to 11 secure both ion conductivity and adhesive strength, having a cell resistivity of 20 to 30Ω and a peel strength of 12 to 52 gf/cm. In Examples 1 to 11 the adhesive resin layer has a mixed phase of a polymer gel phase containing the electrolytic solution and a polymer solid phase. The polymer gel phase containing the electrolytic solution serves for ion conduction, while the polymer solid state achieves adhesive strength.

In case an abnormality occurs in a battery by some cause during use to result in a rise of temperature, the polymer solid phase is swollen with the electrolytic solution. As a result, the electrode and the separator are separated to shut off the current, which is favorable for security.

As shown in FIG. 5, the discharge characteristics (curves B) after an over charge (curves A) were satisfactory. As shown in FIG. 6, the charge characteristics (curves A) after an over discharge (curves B) were also satisfactory.

Industrial Applicability

The present invention provides batteries which can have reduced size and weight and an arbitrary shape as well as improved performance and can be used in portable electronic equipment, such as portable personal computers and cellular phones.

What is claimed is:

1. A lithium ion secondary battery, comprising:
 a plurality of laminates each having a separator holding an electrolytic solution to which a positive electrode and a negative electrode are joined with an adhesive resin layer having a mixed phase composed of an electrolytic solution phase, a polymer gel phase containing an electrolytic solution, and a polymer solid phase, wherein the weight average molecular weight of the polymer of the polymer gel phase is smaller than the weight average molecular weight of the polymer in the polymer solid phase.

2. The lithium ion secondary battery according to claim 1, wherein the plurality of laminates are formed by interposing the positive electrode and the negative electrode alternately among a plurality of cut sheets of the separator.

3. The lithium ion secondary battery according to claim 1, wherein the plurality of laminates are formed by interposing the positive electrode and the negative electrode alternately between rolled separators.

4. The lithium ion secondary battery according to claim 1, wherein the plurality of laminates are formed by interposing the positive electrode and the negative electrode alternately between folded separators.

5. A lithium ion secondary battery according to claim 1, wherein the polymer gel phase and the polymer solid phase contain the same kind or different kinds of polymer materials.

6. A lithium ion secondary battery according to claim 1, wherein the polymer gel phase and the polymer solid phase contain polyvinylidene fluoride.

7. A lithium ion secondary battery according to claim 1, wherein the polymer gel phase and the polymer solid phase contain polyvinyl alcohol.

8. A process for producing a lithium ion secondary battery comprising a plurality of laminates each having a separator holding an electrolytic solution to which a positive electrode and a negative electrode are joined, comprising:
 coating the facing sides of a plurality of separators with an adhesive comprising two or more polymer materials different in weight average molecular weight dissolved in a solvent, joining a positive electrode and a negative electrode alternately among a plurality of separators via an adhesive resin layer to form a battery body, and impregnating the battery body with an electrolytic solution to make the adhesive resin layer a mixed phase composed of a polymer gel phase containing the electrolytic solution, a polymer solid phase, and an electrolytic solution layer, wherein the weight average molecular weight of the polymer of the polymer gel phase is smaller than the weight average molecular weight of the polymer in the polymer solid phase.

9. A lithium ion secondary battery according to claim 1, wherein the polymer gel phase and the polymer solid phase contain the same kind of polymeric materials.

10. The lithium ion secondary battery according to claim 1, wherein the polymer gel phase and the polymer solid phase contain polyvinylidene fluoride, and the weight average molecular weight of the polyvinylidene fluoride contained in the polymer gel phase is smaller than that contained in the polymer solid phase.

11. The process for producing a lithium ion secondary battery according to claim 8, wherein said impregnating step comprises a step of heating the battery so that a polymer material having a smaller weight average molecular weight selectively forms said polymer gel phase and a polymer material having a larger weight average molecular weight selectively forms said polymer solid phase in the adhesive resin layer.

12. A process for producing a lithium ion secondary battery according to claim 11, wherein heating step is a step of heating in a range within room temperature to 70° C.

13. A process for producing a lithium ion secondary battery according to claim 11, wherein heating step is a step of heating in a range within room temperature to 60° C.

* * * * *